(12) United States Patent
Gastineau et al.

(10) Patent No.: US 8,341,070 B2
(45) Date of Patent: *Dec. 25, 2012

(54) EXCHANGE TRADING OF MUTUAL FUNDS OR OTHER PORTFOLIO BASKET PRODUCTS

(75) Inventors: Gary L. Gastineau, Short Hills, NJ (US); Clifford Weber, Denville, NJ (US)

(73) Assignee: NYSE MKT LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/167,457

(22) Filed: Jun. 23, 2011

(65) Prior Publication Data

US 2012/0101959 A1    Apr. 26, 2012

Related U.S. Application Data

(60) Division of application No. 09/815,589, filed on Mar. 23, 2001, now Pat. No. 7,970,687, which is a continuation of application No. 09/536,258, filed on Mar. 27, 2000, now Pat. No. 7,099,838.

(51) Int. Cl.
*G06Q 40/00* (2006.01)
(52) U.S. Cl. ........................................................ 705/37
(58) Field of Classification Search ..................... 705/37
See application file for complete search history.

(56) References Cited

U.S. PATENT DOCUMENTS

| | | | | |
|---|---|---|---|---|
| 5,799,287 A | * | 8/1998 | Dembo | 705/36 R |
| 5,806,048 A | * | 9/1998 | Kiron et al. | 705/36 R |
| 5,987,435 A | * | 11/1999 | Weiss et al. | 705/36 R |
| 6,832,209 B1 | * | 12/2004 | Karp et al. | 705/36 T |
| 7,103,569 B1 | * | 9/2006 | Groveman et al. | 705/35 |
| 2003/0139993 A1 | * | 7/2003 | Feuerverger | 705/36 |
| 2005/0027638 A1 | * | 2/2005 | Ng et al. | 705/37 |

FOREIGN PATENT DOCUMENTS

GB    01/04605    * 10/2001

OTHER PUBLICATIONS

Greene, A.: New Products: AMEX plans active exchange-traded fund, Aug. 21, 2000, Investment Management Weekly, p. 1.*
Gibbons et al.: Testing asset pricing models with changing expectations and unobservable market portfolio, 1985, Journal of Financial Economics, North-Holland, 14, pp. 217-236.*
Grinold et al.,: Multi-Factor Models for portfolio risk, Mar. 1994, Research Foundation Publications, A Practioners Guide to Factor Models. pp. 59-80.*

* cited by examiner

*Primary Examiner* — Bijendra K Shrestha
(74) *Attorney, Agent, or Firm* — Buckley, Maschoff & Talwalkar LLC

(57) ABSTRACT

A system for determining a basket of financial instruments for hedging investment risk in actively managed exchange traded funds is described. The system uses a trusted computer system and includes a computer storage medium storing a computer program product. The product determines the basket of hedging instruments by extracting factor information from a portfolio of the actively managed exchange traded fund and determining factors that affect the price of the exchange traded fund. The program can select a portfolio of instruments with similar behavior with respect to the determined factors to produce a hedging portfolio that tracks the price of the exchange traded fund.

18 Claims, 7 Drawing Sheets

EXCHANGE TRADING OF MUTUAL FUNDS OR OTHER PORTFOLIO BASKET PRODUCTS

CROSS-REFERENCE TO RELATED APPLICATIONS

This is application is a Divisional of U.S. patent application Ser. No. 09/815,589, filed Mar. 23, 2001, now U.S. Pat. No. 7,970,687, which is a Continuation of U.S. patent application Ser. No. 09/536,258, filed Mar. 27, 2000, now U.S. Pat. No. 7,099,838, the contents of which are hereby incorporated by reference.

BACKGROUND

This invention relates to hedging techniques for exchange traded funds or similar basket products.

Exchange traded funds or basket products such as S&P 500 Depository Receipts (SPDRs) are vehicles for holding a basket of securities that can be traded on an exchange or securities market. More specifically, these instruments usually represent an undivided ownership interest in a portfolio of stocks or other securities held by a Trust. The portfolio of stocks is often intended to track the performance of an index like the S&P 500 Index, and therefore seeks to invest substantially all of its assets in the stocks comprising the S&P 500 index, in proportion to the relative weights of stocks in that index. SPDR shares are securities issued by the SPDR Trust and may be traded on a stock exchange or in over the counter transactions.

The intra-day pricing of such securities is determined by supply and demand. Typically, these SPDR fund shares may be created or redeemed at the end of each business day at a net asset value price in so called "creation units". In the case of the SPDRs the creation unit has 50,000 SPDR fund shares. SPDR creation units are created or redeemed at the end of day net asset value through an in-kind transfer of securities corresponding to the S&P 500 index. While the official net asset value (NAV) of the SPDR Trust is only published at the close of every business day, the estimated value of the underlying S&P 500 index and the value of the creation basket are published continuously throughout each trading day. The per SPDR value of the index and/or the creation basket can be devised and distributed electronically to brokers, dealers, and investors throughout the world.

An intra-day value disseminated by the exchange is a real time calculation designed to give an investor a per share price which is very close to what the intraday net asset value would be, if it were calculated. At the end of trading, the intraday approximate calculation and the official NAV should be nearly identical.

Intraday values of exchange traded trusts such as SPDRs or mutual funds such as the Select Sector SPDRs may be evaluated from the publicly available creation basket or the index on a per share basis throughout the day as if the creation basket or the index were the portfolio of the fund. The calculation is relatively straight forward, since the creation basket composition changes little from day to day unless the index changes. While the fund may contain proportionately a few more shares of one stock and a few less of another stock than would be provided by multiplying the creation basket by the number of creation baskets that constitutes the fund, the calculation is very close to net asset value.

Trading on exchanges such as the America Stock Exchange involves a trader called a specialist. A specialist tries to match buy orders with sell orders in a manner that maintains an orderly market. Often specialists and market makers (who make markets for securities on exchanges or on electronic markets such as The Nasdaq Stock Market and who have obligations similar to but less demanding than those of the specialists to help maintain an orderly market) will have to take a contrary position to the prevalent position in the market by placing their own capital at risk. In securities markets, during the course of a trading day, there can be a net demand for a security, e.g., an exchange traded fund. Thus, over the course of a trading day, the specialist and any market makers trading the security can be selling more shares of a security than they are buying. In this situation, the specialist might buy components of the fund or derivatives based on the fund or on an underlying index in order to hedge its position. If the specialists and market makers have bought more shares of a security than they have sold, they might sell short components of the fund or associated derivatives to hedge their positions.

SUMMARY

For actively managed exchange traded mutual funds the composition of the fund may not be known to the market maker or the specialist and hence hedging against a creation unit basket or an index such as the S&P 500 may not be effective, since the fund may behave very differently than the creation unit basket or index. Since there is no corresponding security or index or alternative fund with which the specialist or market maker can hedge a position, trading in such actively managed funds is more difficult than trading a fund based on a known index.

According to an aspect of the present invention, a method of hedging investment risk in actively managed exchange traded funds includes extracting factor information from the portfolio of the actively managed exchange traded fund and determining factors that affect the price of the exchange traded fund. The method also includes selecting a portfolio of financial instruments with similar behavior with respect to the determined factors to produce a hedging portfolio that tracks the price of the exchange traded fund.

According to an additional aspect of the present invention, a computer program product residing on a computer readable medium for hedging investment risk in actively, managed, exchange traded funds includes instructions to extract factor information from a portfolio of the actively managed exchange traded fund, determine factors that affect the price of the exchange traded fund and select a portfolio of financial instruments with similar behavior with respect to the determined factors to produce a hedging portfolio that tracks the price of the exchange traded fund According to an additional aspect of the present invention, a computer system for determining a basket of securities or other financial instruments for hedging investment risk in actively, managed, exchange traded funds includes a trusted computer system and a computer storage medium. The computer storage medium stores a computer program product including instructions to extract factor information from a portfolio of the actively managed exchange traded fund, determine factors that affect the price of the exchange traded fund and select a portfolio of financial instruments with similar behavior with respect to the determined factors to produce a hedging portfolio that tracks the price of the exchange traded fund.

One or more of the following advantages may be provided by one or more aspects of the invention.

The specialist and market maker (each hereinafter referred to as "trader") are provided with information that enables them to buy or sell a specially constructed hedging portfolio that behaves in a very similar way to the underlying fund shares. The specialist and market makers are provided with information that will be helpful in creating a hedging portfolio to help them make markets with narrower spreads with good control of their risks.

DETAILED DESCRIPTION

Figure 1:
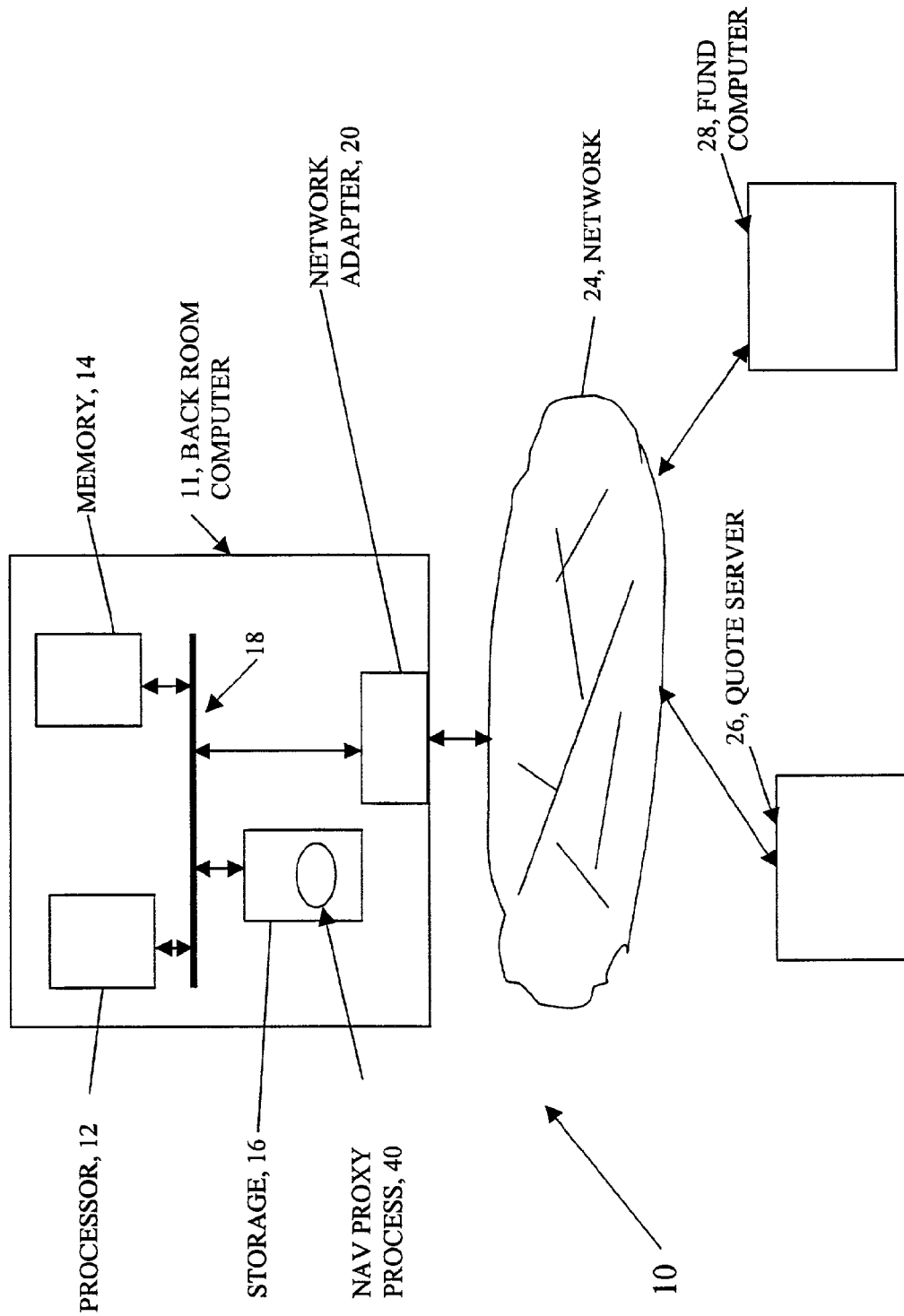
FIG. 1 is a block diagram of a computer system to perform an intra day net asset value proxy calculation.

Referring now to FIG. 1, back room operations of an exchange 10, an electronic market and so forth are shown. The operations 10 include a computer system 11, which includes a CPU 12, main memory 14 and persistent storage device 16 all coupled via a computer bus 18. The computer system 11 may be a server as shown, which is coupled in a network of computers in a conventional manner such as in a client-server arrangement. The details on the client server arrangement are not important to understand the present invention. The computer system 11 can also include output devices (not shown) such as a display and a printer, as well as input user interface devices (not shown) such as a keyboard and a mouse. The computer system 11 also includes a network interface 20, that couples the computer 11 to a network 24. The computer back room operation 10 also receives a quote feed from a quote server 26 and portfolio information from a computer 28 associated with an actively managed fund.

The computer system 10 receives information concerning real-time prices of securities from the quote server 26 and information concerning composition of portfolios from the fund computer 28. The computer system 11 also includes intra-day NAV proxy algorithm software 40 that calculates in real time an intra-day net asset value proxy for an exchange traded fund, in particular for actively managed funds or enhanced index funds. Examples of other products that can use an intra-day NAV calculation can include the value of a spot commodity cool or futures pool; a basket of fixed income instruments chosen for their yields, average maturities, specific durations, the currency in which they are denominated, or for other reasons or characterizations.

Figure 2:
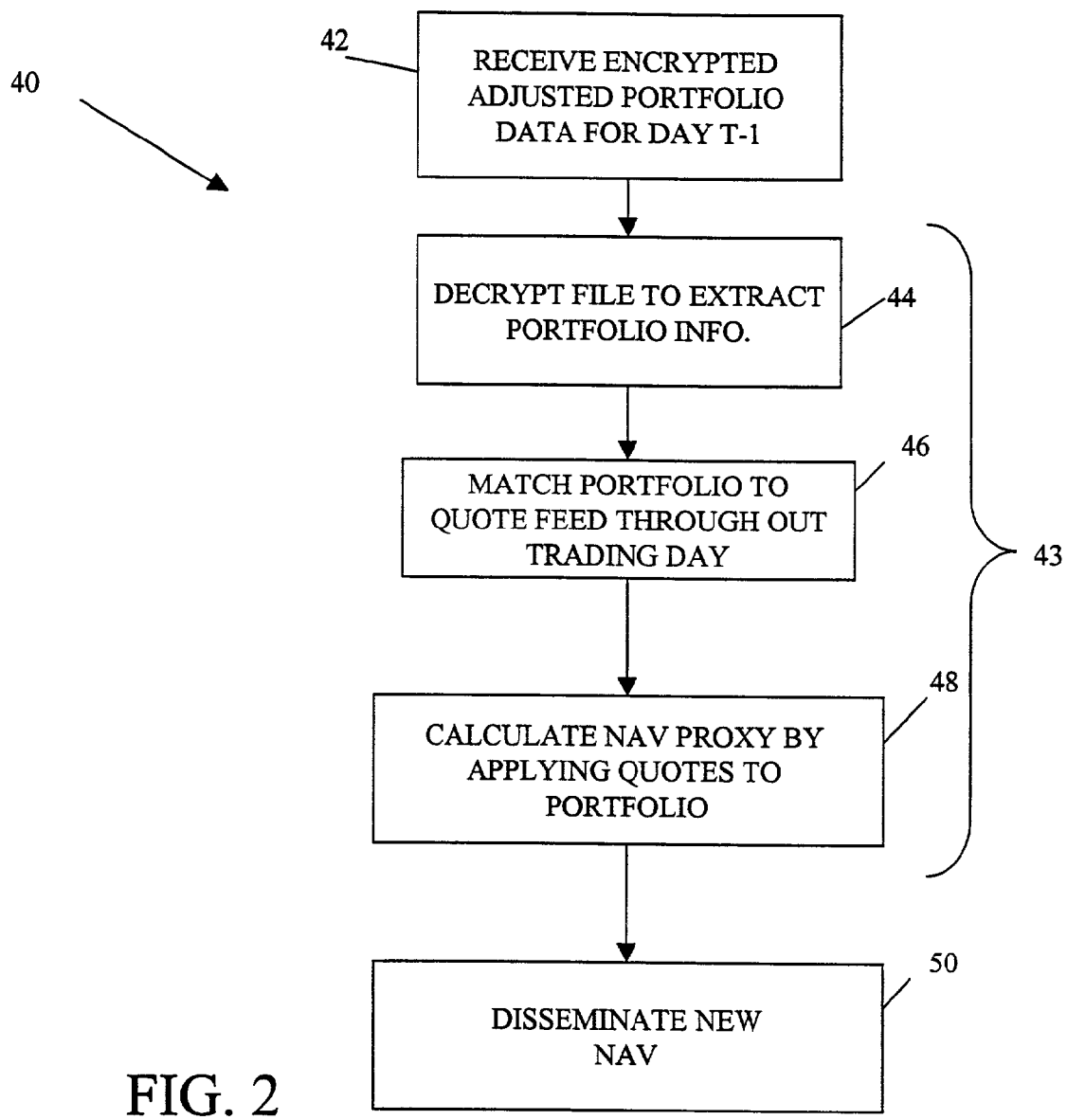
FIG. 2 is a flow chart showing a process to determine an intra-day net asset value proxy of an actively managed fund.

Referring now to FIG. 2, a process 40 to determine an intra-day net asset value proxy is shown. The process 40 can be used to calculate an intra-day NAV proxy for an actively managed portfolio or an enhanced index fund over the course of a trading day. The calculation can be performed in real time. The process 40 will be described in conjunction with an actively managed mutual fund. Once the closing portfolio is revised for the day's transactions, or more accurately, the next day's opening portfolio on which the intra-day NAV proxy and the official closing NAV will be calculated, has been determined and checked for accuracy by the portfolio management organization, the portfolio is encrypted and transmitted to the intra-day price calculation (42).

The net asset value process 40 receives 42 in an encrypted format from the portfolio management organization. This portfolio information has been adjusted to reflect any transactions made on the prior trading day (T−1). Official net asset value calculations that are disseminated to the general media after the close of trading on a current trading day (T) are based on the position of the fund at the close of the prior trading day (T−1). The net asset value is calculated on current day (T) as if no trades occurred during the trading day. In general, this convention makes little difference in the overall net asset value calculation of the fund because it is unusual to have a combination of massive turnover on a single day and a significant difference in price at which shares are sold on a current day and the closing price at which the fund is priced. The portfolio is also adjusted to take into consideration other factors such as dividend credits and expenses attributable to the current day (T). In other embodiments, the actual closing trade date positions of the fund on the current day can be used in the calculation.

The portfolio information is decrypted 44 and the information is used as the template for intra-day calculations. As a check, a closing price tape identical to the tape used in pricing the basket as of the previous night's close, can be fed to the template to determine if the net asset value calculated against the template is identical to the previous day's closing NAV plus or minus known adjustments. The decrypted portfolio can be re-encrypted using the same or a different encryption process and returned to the portfolio management organization where it will again be decrypted and compared with the file originally sent. This process is used to make sure that the file was not corrupted in the original encryption and transmission process. Other checks are possible including error correction, unauthorized use detection, checksums, etc.

The portfolio information file is encrypted using a public encryption key of a public-private key encryption algorithm with the corresponding private key being only known by the net asset value proxy calculation process 40. The received portfolio data is decrypted in the net asset value proxy calculation process 40 using the corresponding private key. A portion 41 of the process 40 is executed within a so called "trusted system". Trusted systems refer to a physical hardware and operating system configuration in which domain configuration and trust relationships are established to determine access to information on the computer 11.

A trusted computer can have the capability to recognize another trusted system, to execute usage rights (in this case access rights for the portfolio information file) and to render the file so that it cannot be copied or sent in decrypted form outside of the process 40. A highly secure channel can be established between the computer 11 and the fund computer 28 to enable a transaction where the two trusted systems exchange data over a communication channel, e.g., the Internet or a proprietary network feed, providing assurances to the fund computer 28 that it is in fact communicating with the exchange back room operation computer 11. Communications over a secure channel can be accomplished with encryption and what are known as challenge-response protocols. Other techniques are possible.

The computer system 11 would have a trusted relationship where a rights or privileges policy is established such that the decrypted portfolio file cannot leave the intra-day net asset value proxy process 40 in a decrypted form. That is, only the intra-day net asset value proxy process 40 itself is given privileges to access the data in the file and no copies can be made of the file. The file may reside in the system throughout trading until replaced with a new file for calculation of intraday net asset value on the next trading day (T+1). At that time the file can be re-encrypted and returned to the actively managed fund or destroyed.

The process 40 matches 46 quotes from a quote feed to stocks in the portfolio throughout the current trading day (T). The process 40 calculates 48 a new net asset value proxy for the fund by applying real-time quotes received from the quote server 26 to positions in the fund portfolio. The process 40 can disseminate 50 a net asset value for the fund on a periodic or continual basis throughout the day.

Figure 3:
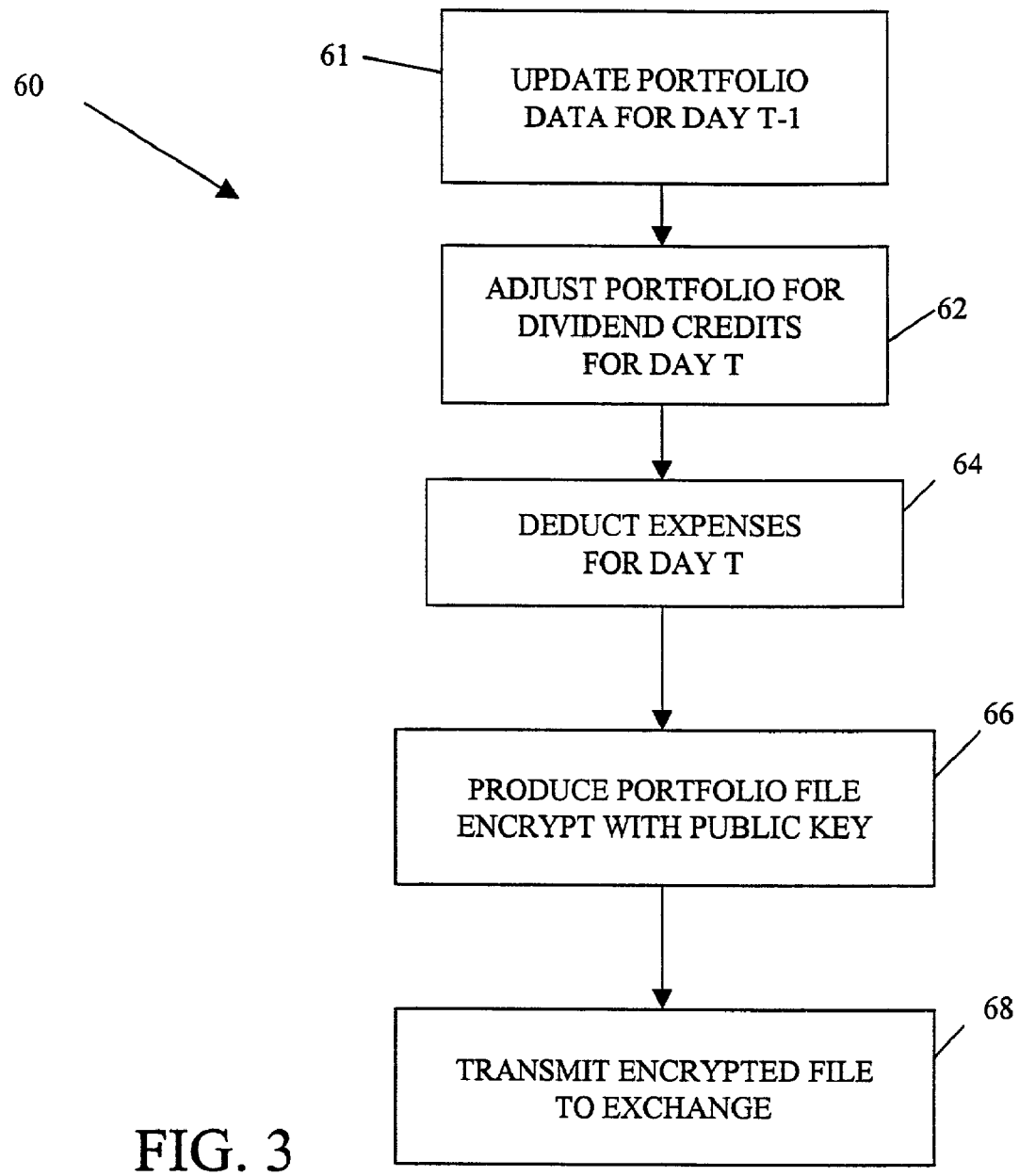
FIG. 3 is a flow chart showing a portfolio adjustment process.

Referring now to FIG. 3, a portfolio adjustment process 60 used to assemble a fund portfolio to send to the intra-day net asset value calculation process 40 is shown. Portfolio adjustment process 60 adjusts 61 portfolio positions to take into consideration any trading that occurred on the previous trading day (T−1). These positions in the portfolio are further adjusted 62 for dividend credits attributable to day (T), as well as adjusting 64 for any expenses attributable to day (T). Cash positions (not shown) are also taken into consideration. The adjusted portfolio is assembled into a portfolio file and includes additional information such as the total number of shares outstanding for the fund or basket, e.g., to quote vendors, and so forth. The portfolio file is encrypted 66 using the public key of the public-private key algorithm used in the process 40. The portfolio is transmitted 68 to the back room operations 10 of the exchange or market where it is received 42 (FIG. 2) and used as described in conjunction with FIG. 2.

Figure 4:
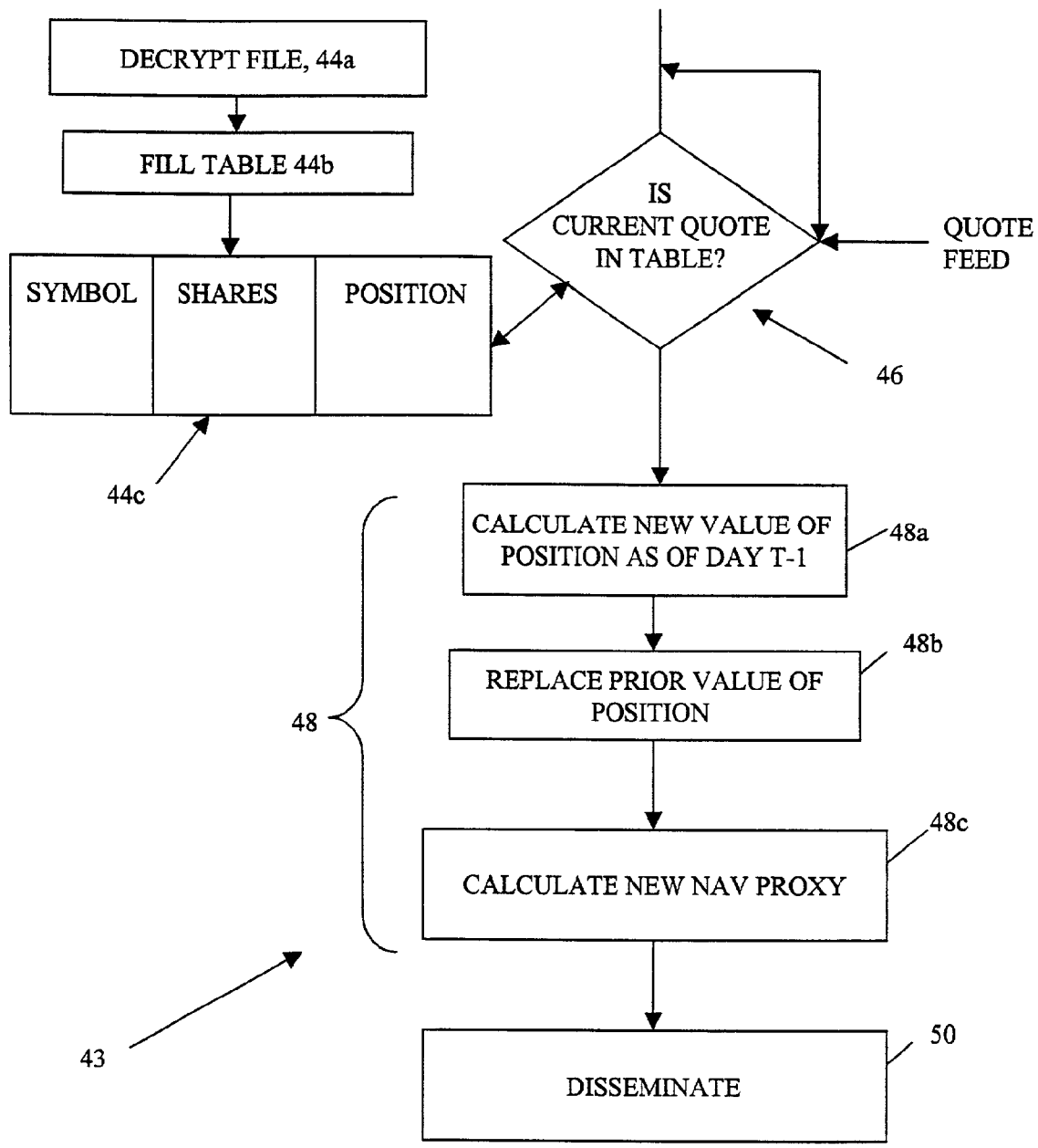
FIG. 4 is a flow chart showing an embodiment of an intra-day valuation process for an actively managed fund.

Referring now to FIG. 4, an embodiment of the intra-day valuation proxy process 40 for an actively managed fund is shown. The process 40 decrypts 44a the portfolio file, as received from the fund manager, and populates 44b a table 44c with fund positions. The table 44c can include, for example, security symbols, quantity of shares held and an indication of whether the position in the shares is a "short" position or a "long" position and so forth.

The process 43 continually receives 45 quotes or transaction prices from the trade and quote feeds and determines 46 whether a currently received security and price corresponds to a security in table 44c and thus is a security in the actively managed fund. If the security and price does not correspond to a security in the table, the process waits 47 to examine the next new security and price. Otherwise, the process 40 will calculate 48a a new value of the position (and its bid and offer if the price is a quote rather than a transaction price of the security) as of the trading day by, for example, retrieving the number of shares in the position and multiplying the number of shares by the current quote for the security. This new value will replace 48b, a prior value for the position in that security. The process 43 will calculate 48c, a new net asset value proxy and/or new bid or offer of underlying instruments, by taking the sum of the values of all current positions in the fund and dividing that by the total number of shares outstanding in the fund.

Another technique that can be used to calculate the net asset value proxy would have the portfolio table 44c include another field that has the value of the position on day (T−1). The table could also have a total of all positions. The net asset value proxy calculation would take the total valuation of the fund, subtract the old value of the position for a security and add the new value of the position for the security into the total. The new sum would be divided by the number of outstanding shares. The new, net asset value proxy calculation is disseminated 50 through the exchange to quote vendors.

With this intra-day net asset valuation proxy process 40, a stock exchange can calculate in real time, intra-day net asset value proxies for actively managed and enhanced exchange traded funds. Portfolio managers are assured that the positions of the fund are not known outside of the fund so that others, e.g., traders and competitors will not know what securities the fund is buying and selling. This is important to maintain a fiduciary duty to keep positions confidential where confidentiality is in the interest of the shareholders of the fund. Thus, this technique assures confidentiality while enabling the system 10 and, the backroom computer 11, to give investors up-to-date, i.e., real time information on valuations to facilitate trading in the mutual fund or trust instrument. Maintaining the confidentiality of this knowledge is important because public dissemination of the information may enable individuals and organizations in effect to trade against the fund. This confidentiality is assured by encrypting the file and only providing the software with the decryption key to decrypt the portfolio position information in the file.

The portfolio information is only available to the net asset value proxy calculation internal to the computer. The information is either re-encrypted or destroyed so that unauthorized access is prevented. This provides a process for determining an intra-day NAV proxy for actively managed or enhanced index funds that protects the information that the fund manager transmits to the intra-day NAV proxy calculation server.

A real time calculated net asset value proxy disseminated to the market may provide several advantages to the market. The real time calculated net asset value proxy can help establish tight valuation ranges (e.g., lower spreads between bid and ask) which may lead to tight pricing in markets for the basket of securities used to establish the funds. To the extent that trading in the basket would facilitate the formation of more units of the basket, i.e., creation of additional units of an exchange traded fund or additional units of a commodity basket, etc., the cost of maintaining and operating the basket or portfolio would be spread over a larger pool of assets. Consequently, the costs per-dollar of assets in the portfolio or basket might be reduced.

The backroom computer 11 on which the NAV calculation is performed should have appropriate testing procedures for evidence of tampering with software, hardware or data files or access by unauthorized persons to provide a high degree of both physical and data security during the period the decrypted portfolio file is in use in the calculation of intra-day Net Asset Value Proxies. The use of dual processors or systems; for redundancy i.e., fault tolerance, would also be appropriate. In addition to improving reliability, a fault tolerant system can facilitate management of the system if there is a problem in the calculation module. The ordinary steps that the management of a system installation could take to repair a hardware or software problem may be rendered more difficult by the encryption-decryption process and by the protections built into the processor. In other words, both the hardware and software may be less accessible than they would be in a normal installation.

Another aspect of the calculation is that it can provide in the context of an actively managed fund bid and offer values and a spread in terms of the fund intra-day NAV proxy. While the calculation generally is comparable in every material respect to the traditional 4:00 P.M. net asset value calculation, it may not be called a NAV calculation when distributed to the market because of the issue of liability for any data or calculation errors and because investors cannot necessarily buy or sell shares from the fund at that price. In addition, 4:00 P.M. closing prices are subject to verifications that may not be practical in an intra-day calculation.

The NAV proxy calculation could be used in a process to provide a hedging portfolio. Alternatively, the calculation used in a hedging portfolio could be provided by the advisor, custodian, fund manager, etc. without encrypting or transmitting any data. Specialists and market makers manage their positions over the course of a trading day, generally to maintain either a market neutral or fund share risk neutral position or a specific level of exposure that is independent of supply and demand for the shares they are trading.

In the case of an index fund, the specialist or market maker that sells shares to a public shareholder who comes to the market to buy may, at the same time as the fund share sale occurs, buy stock index futures contracts or an index equivalent basket of stocks or other instruments to maintain a consistent degree of exposure. However, an actively managed or enhanced index fund will not be as readily hedgeable using a single benchmark index/stock index futures contract as an index fund and the contents of the fund may be partly or completely unknown to the specialist or market maker.

Figure 5:
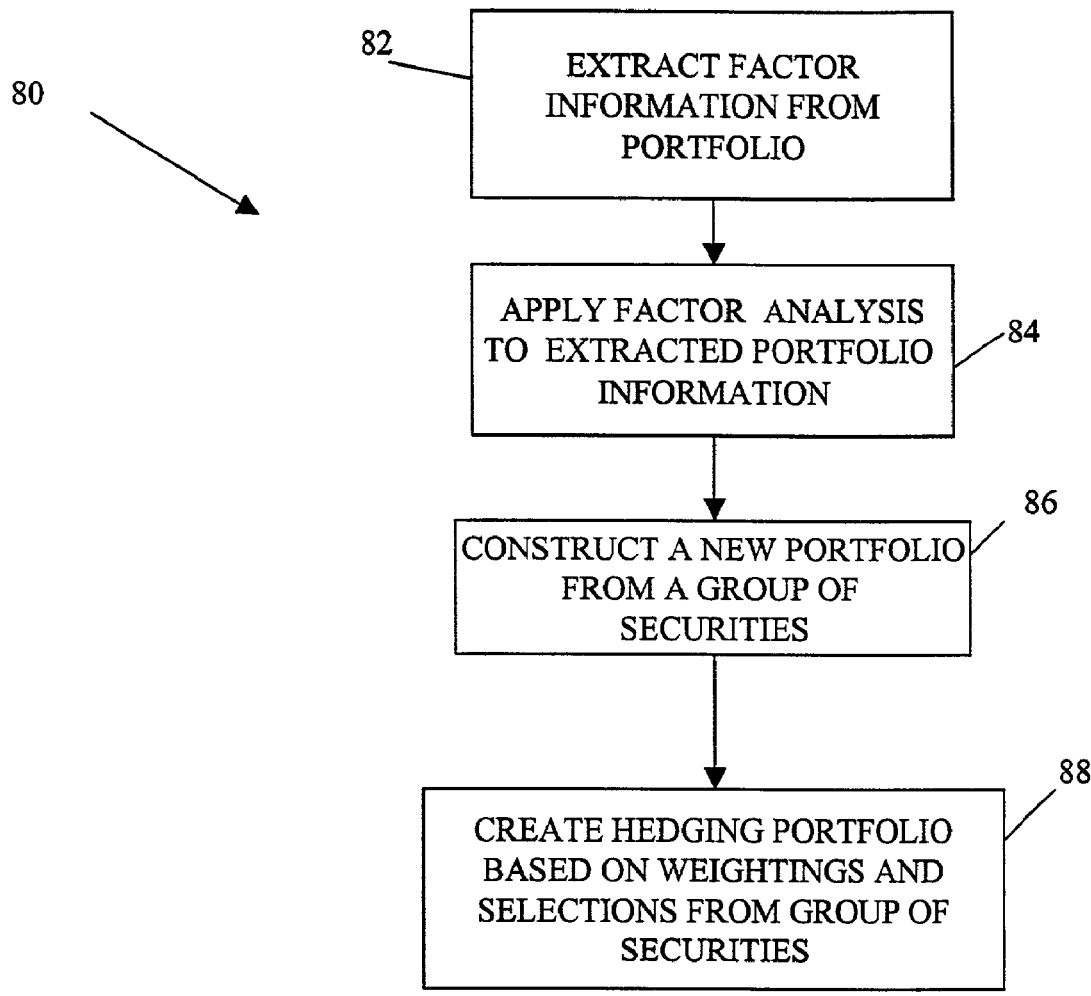
FIG. 5 is a flow chart showing a process for producing a hedging portfolio for an actively managed exchange traded fund.

Referring to FIG. 5, in one embodiment, the specialist does not know what is in the portfolio because the valuation is calculated from encrypted data in the trusted system 41. A hedge creation process 80 sends 82 the portfolio to another trusted process in the computer 11 or to another computer having a trusted process. In any event, the trusted process extracts 82 factor information from the portfolio and applies 84 factor analysis to the extracted portfolio information.

Factor analysis, as described, for example, in the following papers: M. A. Berry, E. Brumeister and M. B. McElroy, "Sorting Out Risks Using Known APT Factors," *Financial Analysts Journal* 44 (1988), 29-42; K. C. Chan, N. F. Chen and D. Hsieh, "An Exploratory Investigation of the Firm Size Effect, " *Journal of Financial Economics* 14 (1985), 451-471; B. A. Rosenberg, "Extra-Market Components of Covariance in Security Returns," *Journal of Financial and Quantitative Analysis* 9 (1974), 263-274; S. Beckers, R. Grinold, A. Rudd and D. Stefek, "The Relative Importance of Common Factors Across the European Equity Markets," *Journal of Banking and Finance* 16 (1992), 75-97; J, K, Kale, N. H. Hakansson and W. G. Platt "Industry Factors versus Other Factors in Risk Prediction," working paper, University of California, Berkeley (1991); E. F. Fama and K. R. French, "Common Risk Factors in the Returns of Stocks and Bonds," *Journal of Financial Economics* 33 (1993), 3-56; B. Lehman and D. A. Modest "The Empirical Foundation of the Arbitrage Pricing Theory" *Journal of Financial Economics* 21 (1988), 213-254; and G. Connor and R. A. Korajczyk "A Test for the Number of Factors in an Approximate Factor Model", *Journal of Finance* 48 (1993), 1263-1292, can be used to analyze how various factors have an effect on pricing of the underlying portfolio. These papers are incorporated herein by reference.

The factors that are examined by applying 84 factor analysis include factors such as economic activity, inflation rates, industry membership growth value linked behavior or other factors that are related to measures of security price behavior.

As an example, the specialist can be provided with a portfolio of e.g., 100 financial instruments and information of appropriate weightings of each of the instruments. Each of the 100 financial instruments will have distinctive factor characteristics. That is, some of the financial instruments are more interest sensitive, some are more inflation sensitive, some are more sensitive to industrial production, or to any one of a number of other economic and financial market variables.

The process 80 constructs 86 a factor weighted portfolio by selection and weighting those 100 instruments based on results of applying 86 factor analysis. Ideally, the factor-based portfolio would be virtually identical in market performance to the exchange traded fund. The performance expectation would be based on historic relationships, as analyzed by the factor model. The specialist and market makers are given a list of instruments and the proportions of each instrument needed to take risk offsetting positions to hedge any long or short position they may be called upon to take in the shares of the fund. The traders would use that information to create 88 a hedging portfolio.

While the hedging portfolio will not be identical in performance to the fund nor will it conform as closely to the fund performance as an index basket or instrument does with a fund based on an index, nevertheless, the hedging portfolio should track the exchange traded fund portfolio closely enough over the course of a trading day or even a long period of time to protect the trader from major losses. The hedging portfolio would be updated daily to reflect changes in the composition of the fund portfolio. These hedging portfolios need to be liquid so that the specialist can convert the position to cash or some particular portfolio (that can be used as a creation basket for the fund) at the end of the day.

Figure 6:
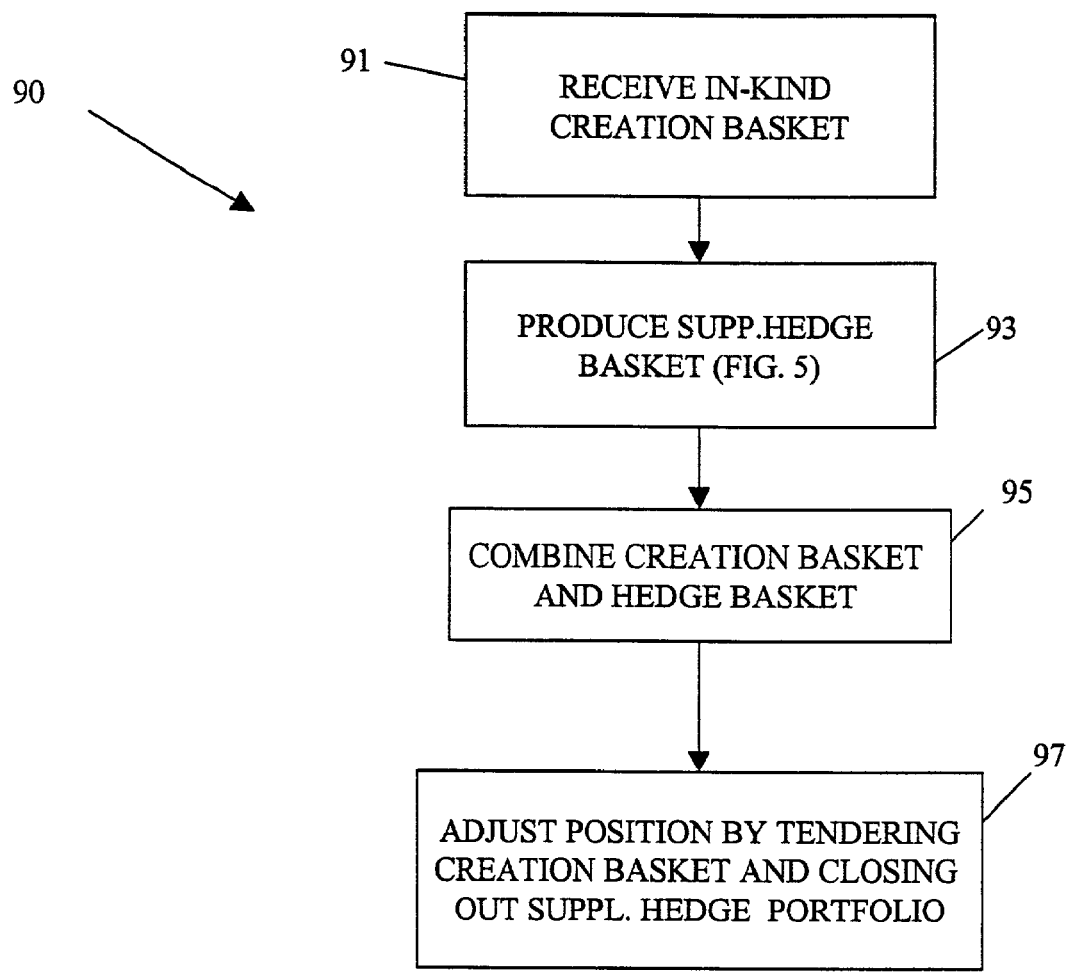
FIG. 6 is a flow chart of an alternative hedging process for an actively managed exchange traded fund.

The hedging portfolio can also be used to calculate a Net Asset Valuation proxy much like that described above. However, rather than using actual positions in the exchange traded fund, the NAV process will use the positions in the hedging portfolio and apply current prices to those positions along with their weightings in the hedging portfolio to determine a NAV proxy value. The hedging portfolio used need not be identical to the actual hedge portfolio since the hedge portfolio might not take positions in certain securities since there might not be a liquid enough market for the security and so forth:

Referring to FIG. 6, a variation of the stand-alone hedging portfolio described above is shown. This process 90 receives 91 an in-kind creation basket that is posted or provided by the fund or instrument that the trader trades. The trader would produce 93 a supplemental hedging portfolio or basket as described above. The trader thus would include this supplementary hedging portfolio as an add-on portfolio to be used in conjunction with the in-kind creation basket posted by the fund. In this case, the trader combines 95 a position in the creation (redemption) basket with a position in a supplementary hedge basket. At some point during trading, the trader could tender 97 (or receive) the creation (redemption) basket to adjust its fund share position at the end of the day and close out the supplementary hedge portfolio at the close.

To explain this process in more detail, a creation basket for an actively managed fund may not exactly match the portfolio and thus, it may not be suitable as a stand-alone hedging basket. The creation basket may be different from the fund portfolio to various degrees and, thus, the creation basket may not closely track the actively managed fund on an intra-day basis. Thus, rather than the specialist using the creation basket alone as a hedging instrument, the trader could use the factor portfolio process described above or a combination of the creation basket and the supplementary hedging basket produced by the factor portfolio process, because the trader may need a creation basket at the end of the day to exchange for the fund shares. The trader would need to close out the supplementary hedging basket in a very low cost manner perhaps using market-on-close-orders. This is another feature provided to traders for use in hedging their positions.

These features are designed to make markets tighter (i.e., lower spreads between bid and asked prices) and to provide services which encourage people to list their funds on the exchange. To the extent that an intraday net asset value proxy is determined, it enables the specialist to know the appropriate price for shares that the specialist buys and sells over the course of the day. The investor can know that the market is fair and that bid and offer prices tightly bracket the intraday net asset value proxy. The intraday NAV proxy process described above processes such data for an actively managed, exchange traded fund for which the actual positions in the fund are not known outside of the fund management organization.

The hedging portfolio reduces the risk that the market maker or specialist takes because there is a basket, that is the hedging portfolio, that closely approximates the behavior of the exchange traded fund on the long side of the market when the specialist shorts the shares or on the short side when the specialist sells the hedging portfolio (short) to hedge a long position in the fund shares.

With this hedging portfolio, the exchange facilitates risk management for the specialist and replicates the risk as closely as possible to the risk that the trader is accepting. The hedging portfolio minimizes but does not eliminate tracking error. The hedging portfolio enables the specialist or market maker to hedge its portfolio efficiently at a lower cost than they could do with no more than the fund's last reported portfolio because that portfolio could easily be six months or more out of date.

The factor model provides the specialist or market maker with a portfolio of instruments, securities, etc. that will enable the specialist to create a hedge that will track the basket of securities that make up the exchange traded fund portfolio without the specialist ever knowing what specific securities are in the fund.

The encrypted information is used to extract factors that affect the value of the securities that make up the exchange traded fund. The exact process will depend on the type of factor model used. Assume that a Sharpe-type factor model is used. The Sharpe model will take an existing portfolio back in time (not the actual portfolio that was in the fund in the past because the actual portfolio may change from day to day, but the actual portfolio at the prior day's close as if that portfolio had been in the fund all along).

Referring back to FIG. 5, the process 80 takes a potential hedging portfolio of, e.g., 100 instruments, and executes a computer implemented model to determine weights, if any, in each of these instruments to give the best possible tracking of the actual fund portfolio. The specialist or market maker who needs to hedge a position is provided with the appropriate weighted portfolio of instruments which would have tracked that portfolio very closely or to a specific degree of tolerance or tracking error over the prior period. This information is used by the specialist or market maker to produce a hedging portfolio to offset the risk of shorting the fund shares when there is more demand for the fund shares than the traders can supply from inventory, or going long the fund shares and short the hedging basket when there is less demand for fund shares and the traders must absorb fund shares into inventory.

Thus, the net asset value proxy calculation and the portfolio of hedging instruments provide additional information for specialists and market makers on the floor to enable them to make better markets. While this information may not be disseminated to market makers in other markets due to economic, regulatory and liability factors, the existence of the information should make these markets better (deeper and with a tighter spread) as well.

Unlike a synthetic hedging portfolio that is based on historical closing NAV while keeping the contents of the portfolio confidential, the hedging basket, to be effective, must be based on the current portfolio. In the synthetic hedging portfolio, only the closing NAV calculations are used. Back over a period of time, these calculations become less relevant to the current contents of the portfolio. Furthermore, to the extent that the portfolio changes in a material way, net asset value calculations from even a few days earlier may give a misleading picture of the investment characteristics of the portfolio.

Figure 7:
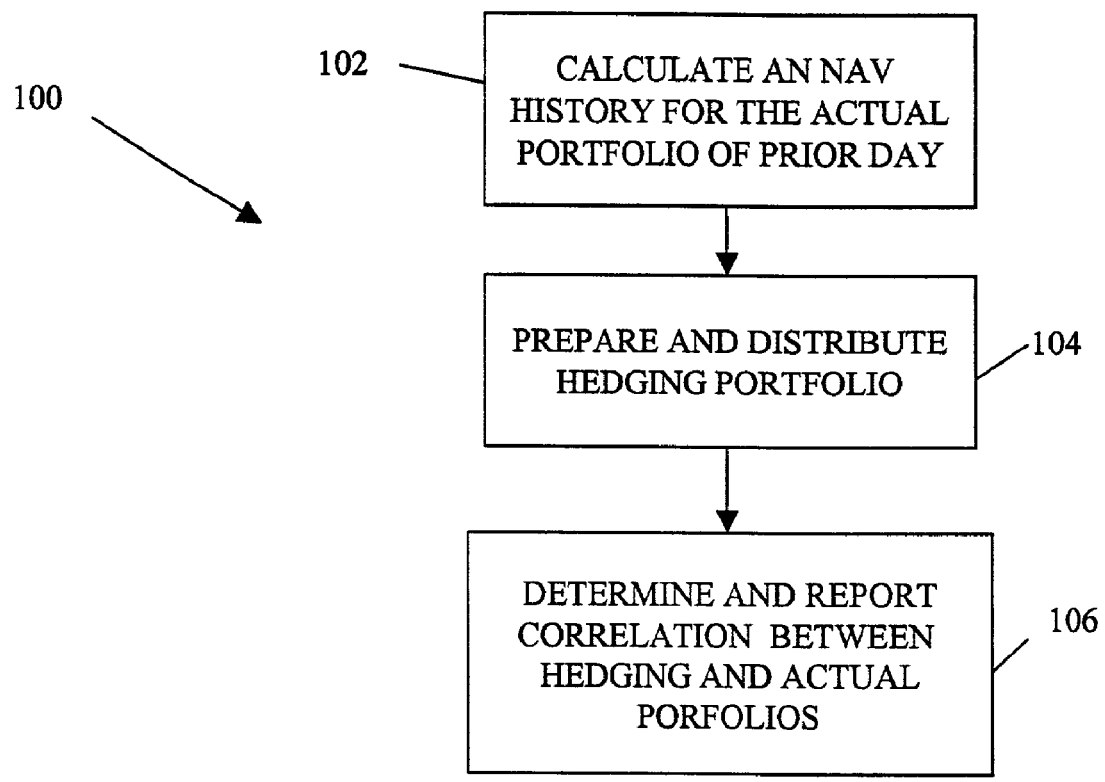
FIG. 7 is a flow chart showing an alternative process for producing a hedging portfolio for an actively managed exchange traded fund.

Referring to FIG. 7, an alternative process 100 for a market maker or specialist to hedge a portfolio is shown. The alternative process calculates 102 an NAV history for the actual portfolio (as of the previous day's close). The process 100 prepares and disseminates 104 a hedging portfolio for the use of the specialist, market makers and, perhaps, arbitrageurs interested in creating a hedging position. The process 100 could be executed by the fund custodian or advisor or by the exchange using an encrypted portfolio much the same way that the NAV proxy calculation is determined. The process 100 would price that portfolio using a price database. As long as the instruments to be evaluated and included in the recommended hedge and the technique used are known in advance, it should be possible to reduce tracking error. The entity that prepares and disseminates the hedging portfolio reports 106 a correlation or the tracking of the hedging portfolio with the fund portfolio. In order to determine tracking error, the entity needs actual knowledge of the portfolio as it exists at the previous night's close.

In general, such a hedging portfolio would be fairly constant, unless and until there was a material change in the contents of the fund portfolio, at which time the hedging portfolio would probably change. Changes in the hedging portfolio could result from a broad change in the underlying portfolio, e.g., a shift from technology stocks to financial stocks. Disseminating information on specific portfolio changes might not be acceptable to the advisor. Rather, the advisor may choose to accept the cost of not providing a close tracking hedging portfolio, recognizing that the cost will include wider spreads and, probably, less liquidity in fund shares in the market.

The hedging portfolio, a variation on full dissemination of the portfolio, will be acceptable to many fund advisors. A participant who was considering creating or redeeming shares would look at a creation or redemption basket as part of the hedging position. The rationale for the redemption basket is that if the market maker or arbitrageur sought to redeem the basket, the portfolio he would receive would be for the redemption basket and would in many cases be different from the actual fund portfolio and from the creation basket. To the extent that the creation or redemption basket does not match the fund portfolio, the advisor or fund manager can add additional instruments (i.e., the supplementary hedging basket to the creation or redemption basket) to improve tracking. The additional instruments could be provided to improve the tracking of the entire hedging position. The additional instruments could improve tracking for various market participants, particularly those engaged in arbitrage and market making, will help improve the quality of their hedges, and should have the highly beneficial effect of reducing the bid-asked spread.

This alternative approach to producing a synthetic portfolio using a factor model or other technique has several advantages. The synthetic hedging portfolio might include a mixture of futures contracts, options and/or a number of stock positions that collectively mirror the historic behavior of the current portfolio. Using any of several types of factor models, the buyer can develop a hedging portfolio that will be more highly correlated with the fund than any single futures contract.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A computer-implemented method for producing a hedging basket of securities for an actively managed fund on an exchange, comprising:
   receiving, by a computer processor, information associated with an actively managed fund;
   extracting factor information from the information;
   applying a factor analysis to the extracted factor information;
   selecting, based on application of the factor analysis, a hedging basket of securities, the hedging basket of securities selected such that the hedging basket of securities tracks the actively managed fund over the course of a trading day and do not disclose the assets of the actively managed fund; and
   transmitting at least one of the extracted factor information and information associated with the hedging basket of securities to a trader, the transmitted information used by a trader for creating a hedging portfolio that manages investment risk in the actively managed fund;
   wherein the fund assets are not disclosed to the trader.

2. The computer-implemented method of claim 1, wherein the factors that are examined by the factor analysis include factors related to at least one of measures of economic activity and inflation rates.

3. The computer-implemented method of claim 1, further comprising:
   calculating an intra-day net asset value proxy for the actively managed fund.

4. The computer-implemented method of claim 3, wherein the prices are received from a quote feed.

5. The computer-implemented method of claim 1 wherein the applying the factor analysis is performed in a trusted computer system.

6. The computer-implemented method of claim 3, wherein calculating an intra-day net asset value proxy further comprises:
   adjusting the actively managed fund to reflect any transactions made in the prior trading day.

7. The computer-implemented method of claim 6, wherein the adjusting the actively managed fund further comprises:
   adjusting the actively managed fund using data identifying events including dividend credits and expenses incurred in the prior trading day.

8. The computer-implemented method of claim 5, wherein the trusted computer system includes a physical hardware and operating system configuration in which domain configuration and trust relationships are established to determine access to information in the trusted computer system.

9. The computer-implemented method of claim 8, wherein the trust relationships include code to deny unauthorized access to decrypted information associated with the actively managed fund.

10. A non-transitory computer-readable medium storing processor-executable process steps that, when executed by a processor, perform a method producing a hedging basket of securities for an actively managed fund on an exchange, wherein the method comprises:
    receiving information associated with an actively managed fund;
    extracting factor information from the information;
    applying a factor analysis to the extracted factor information;
    selecting, based on application of the factor analysis, a hedging basket of securities, the hedging basket of securities selected such that the hedging basket of securities tracks the actively managed fund over the course of a trading day and do not disclose the assets of the actively managed fund; and
    transmitting at least one of the extracted factor information and information associated with the hedging basket of securities to a trader the transmitted information used by a trader for creating a hedging portfolio that manages investment risk in the actively managed fund;
    wherein the fund assets are not disclosed to the trader.

11. The non-transitory computer-readable medium storing processor-executable process steps of claim 10, wherein the factors that are examined by the factor analysis include factors related to at least one of measures of economic activity and inflation rates.

12. The non-transitory computer-readable medium storing processor-executable process steps of claim 10, further comprising:
    calculating an intra-day net asset value proxy for the actively managed fund by applying prices to at least a first security position in the actively managed fund as of the close of trading on the prior trading day.

13. The non-transitory computer-readable medium storing processor-executable process steps of claim 12, wherein the prices are received from a quote feed.

14. The non-transitory computer-readable medium storing processor-executable process steps of claim 10 wherein the applying the factor analysis is performed in a trusted computer system.

15. The non-transitory computer-readable medium storing processor-executable process steps of claim 12, wherein calculating an intra-day net asset value proxy further comprises:
    adjusting the actively managed fund to reflect any transactions made in the prior trading day.

16. The non-transitory computer-readable medium storing processor-executable process steps of claim 15, wherein the adjusting the actively managed fund further comprises:
    adjusting the actively managed fund using data identifying events including dividend credits and expenses incurred in the prior trading day.

17. The non-transitory computer-readable medium storing processor-executable process steps of claim 14, wherein the trusted computer system includes a physical hardware and operating system configuration in which domain configuration and trust relationships are established to determine access to information in the trusted computer system.

18. The non-transitory computer-readable medium storing processor-executable process steps of claim 17, wherein the trust relationships include code to deny unauthorized access to decrypted information associated with the actively managed fund.

* * * * *